(12) United States Patent
Mouli et al.

(10) Patent No.: US 7,685,266 B2
(45) Date of Patent: Mar. 23, 2010

(54) MANAGEMENT OF TOOLS THAT PROCESS DATA TO DESCRIBE A PHYSICAL LAYOUT OF A CIRCUIT

(75) Inventors: Chandra Mouli, Portland, OR (US); Kedar Dongre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 11/529,676

(22) Filed: Sep. 28, 2006

(65) Prior Publication Data

US 2008/0082663 A1 Apr. 3, 2008

(51) Int. Cl.
*G06F 15/173* (2006.01)
*G06F 17/50* (2006.01)
*G03F 1/00* (2006.01)

(52) U.S. Cl. .............................. 709/223; 716/19; 430/5

(58) Field of Classification Search ......... 709/223–226; 718/100; 716/1–9, 12, 19–21; 430/5–10
See application file for complete search history.

(56) References Cited

U.S. PATENT DOCUMENTS

| | | | | |
|---|---|---|---|---|
| 5,892,682 A * | 4/1999 | Hasley et al. ................. 716/12 |
| 7,043,730 B2 * | 5/2006 | Tanaka ....................... 718/104 |
| 7,082,604 B2 * | 7/2006 | Schneiderman ............. 718/100 |
| 7,107,571 B2 * | 9/2006 | Chang et al. .................. 716/19 |
| 7,165,256 B2 * | 1/2007 | Boudnik et al. ............. 718/104 |
| 7,243,316 B2 * | 7/2007 | White et al. .................... 716/4 |
| 7,275,227 B1 * | 9/2007 | Ying .............................. 716/5 |
| 7,409,656 B1 * | 8/2008 | Ruehl ............................ 716/5 |
| 7,506,293 B2 * | 3/2009 | Dasdan et al. ................. 716/6 |
| 2003/0074430 A1 * | 4/2003 | Gieseke et al. ............. 709/221 |
| 2004/0006584 A1 * | 1/2004 | Vandeweerd ................ 709/107 |
| 2006/0250981 A1 * | 11/2006 | Li et al. ...................... 370/254 |
| 2007/0124718 A1 * | 5/2007 | Kobayashi et al. ............ 716/19 |
| 2008/0028075 A1 * | 1/2008 | Dini et al. ................... 709/226 |
| 2008/0059554 A1 * | 3/2008 | Dawson et al. ............. 709/201 |
| 2008/0077891 A1 * | 3/2008 | Dooling et al. ................ 716/4 |

OTHER PUBLICATIONS

Mike Magee, 1999, "What teh hell is . . . a tapeout?". posted in Business http://www.theregister.co.uk/1999/07/14what_the_hell/.*

\* cited by examiner

*Primary Examiner*—Joseph E Avellino
*Assistant Examiner*—Catherine Thiaw
(74) *Attorney, Agent, or Firm*—Lee & Hayes, PLLC

(57) ABSTRACT

Presented herein are embodiments of techniques to manage a plurality of tape-out tools each executing on a plurality of computing devices. The tape-out tools designed to process circuit design data to physical mask data which describes the physical layout of a circuit. The techniques including management of resources used by a tape-out tool and real-time feedback from a tape-out tool.

7 Claims, 4 Drawing Sheets

MANAGEMENT OF TOOLS THAT PROCESS DATA TO DESCRIBE A PHYSICAL LAYOUT OF A CIRCUIT

BACKGROUND

Modern semiconductor devices may utilize intricate layouts involving a variety of circuit components to provide a wide array of functionality. To produce these layouts, circuit design files are generally created which describe the functionality to be included in the semiconductor device in what is typically referred to as a "tape-in" process. These circuit design files are then processed using executable circuit design tools to form a physical layout that is suitable to form a physical mask in what is typically referred to as a "tape-out" process.

The executable tools that are utilized to perform the "tape-out" process, however, are typically executed in isolation and therefore have limited interaction with other executable tools utilized during the process. Additionally, the resources used by the tools may be quite significant, thereby increasing the complexity when coordinating the execution of these tools. Further, these tools traditionally provide limited feedback during execution and therefore limit identification of problems that may arise during execution of the tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform techniques to manage tools that process data to describe a physical layout of a circuit. Exemplary procedures are then described that may be employed in the exemplary environment, as well as in other environments.

Exemplary Environment

Figure 1:
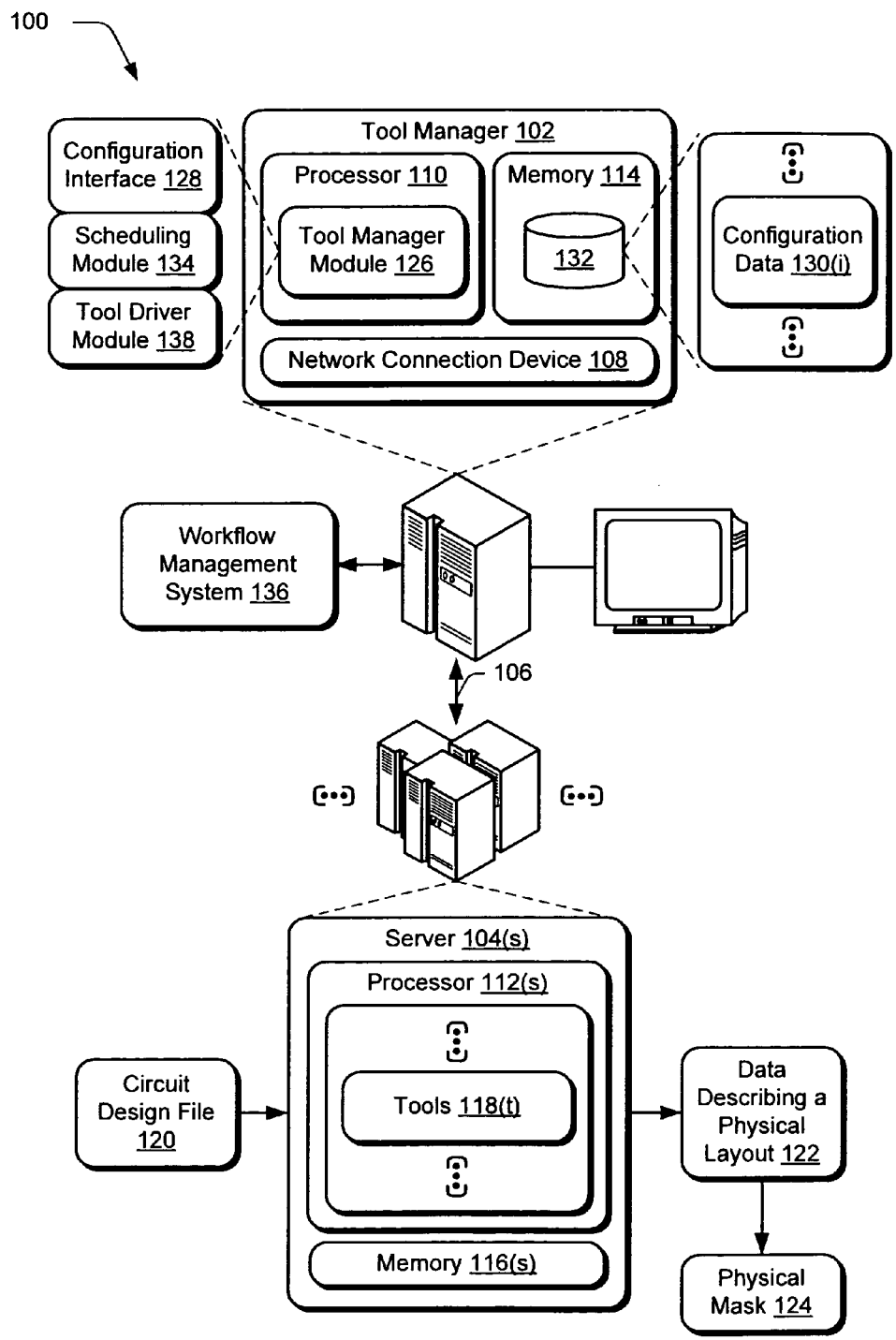
FIG. 1 is an illustration of an environment in an exemplary implementation that is operable to employ techniques to manage tools that process data to describe a physical layout of a circuit.

FIG. 1 is an illustration of an environment 100 in an exemplary implementation that is operable to employ techniques to manage tools that process data to describe a physical layout of a circuit. The illustrated environment 100 includes a tool manager 102 that is communicatively coupled to one or more servers 104(s) (where "s" can be any integer from one to "S") over a network 106. Because the servers 104(s) may be representative of one or more servers, in portions of the following discussion the representative server may be referenced alone (e.g., server 104(s)) or in plural form (e.g., the plurality of servers 104(s), servers 104(s), and so on).

The tool manager 102 may be configured as a wide range of computing devices, such as a desktop personal computer, an information appliance, a server, and so on. To communicate over the network 106, the tool manager 102 is illustrated as including a network connection device 108, such as network card (e.g., an Ethernet card), modem, digital subscriber line device, cable modem, and so forth.

The tool manager 102 and the servers 104(s) are each illustrated as having respective processors 110, 112(s) and memory 114, 116(s). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computer, may include, but are not limited to, quantum computing, optical computing, mechanical computing (e.g., using nanotechnology), and so forth. Additionally, although a single memory 114, 116(s) is shown, respectively, for the tool manager 102 and the server 104(s), a wide variety of types and combinations of memory may be employed, such as random access memory (RAM), hard disk memory, removable medium memory, and other types of computer-readable media.

Additionally, the network 106 may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The servers 104(s) are illustrated as executing one or more tools 118(t) (where "t" can be any integer from one to "T") on the processor 112(s), which are also storable in memory 116(s). The tools 118(t) are representative of functionality that is executable to process a circuit design file 120 into data describing a physical layout 122 that is suitable to form a physical mask 124. The tools 118(t), for instance, may be executable to determine routing between components of the circuit, compliance with desired design parameters (e.g., detection of violations such as "pinch" and "bridge" violations), determination of which components to include to provide desired functionality, and so on. A physical mask 124 formed from data describing the physical layout 122 may then be used to form a semiconductor device having the circuit through a photolithographic process.

As previously described, however, traditional execution of the tools 118(t) was performed in isolation such that the tools 118(t) had limited interaction with other executable tools utilized during the "tape-out" process. Further, the interaction with a technician/engineer was also limited as these tools traditionally provided limited feedback during execution, such as through the use of log files that were typically accessed after execution of the tool was completed. This lack of feedback limited identification of problems that may arise during execution of the tools and therefore may result in further delay when the errors are encountered. Additionally, the resources used by the tools may be quite significant, thereby increasing the complexity when coordinating execution of the tools. For example, the tools 118(t) may be executed by tens of thousands of servers 104(s) and further each of the tools 118(t) may consume different amounts of resources, e.g., processor 112(s), memory 116(s), file systems, network, and so on.

Accordingly, the tool manager 102 includes a tool manager module 126 that is representative of a variety of functionality that may be employed to manage execution of the tools 118(t) by the servers 104(s). The tool manager 102 of FIG. 1 is illustrated as executing a tool manager module 126 on the processor 110, which is also storable in memory 114. The tool manager module 126, for instance, may provide a configuration interface 128 to configure an execution sequence of the tools 118(t), such as through interaction with a technician or automatically through processing of a "job", further discussion of which may be found below. The configuration interface 128 may also be used to provide configuration data 130(i) (where "i" can be any integer from one to "I") to the tools 118(t) to be used during execution of the tools 118(t). Although the configuration data 130(i) is illustrated as included in storage 132 in the memory 114, it should be readily apparent that the configuration data 130(i) may be stored and retrieved from a variety of locations.

The tool manager module 126 may also employ a scheduling module 134 that is representative of functionality to interact with a workflow management system 136 that provides "jobs" (i.e., workflows) to be performed by one of more of the tools 118(t). The jobs, for instance, may detail tasks to be performed by the various tools 118(t) to process the circuit design file 120 into data 122 that is suitable to form the physical mask 124. Upon receipt of the job by the scheduling module 134, resources of the servers 104(s) may be provisioned to cause the tools 118(t) to perform the tasks as specified by the job, further discussion of which may be found in relation to FIGS. 2-3.

The tool manager module 126 is further illustrated as including a tool driver module 138 that is representative of functionality to interface with the tools 118(t) to manage their execution. For example, the tool manager module 126 may be configured to translate tasks specified by the jobs into a form that is compatible with the respective tools. Further, the tool driver module 138 may also translate data output by the tools 118(t) into a form that is compatible (i.e., "understood") by the workflow management system 136, further discussion of which may be found in relation to FIGS. 2 and 4.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory 114, 116(s). The features of the techniques to manage "tape-out" tool execution described below are platform-independent, meaning that the techniques may be implemented on a variety of commercial computing platforms having a variety of processors.

Figure 2:
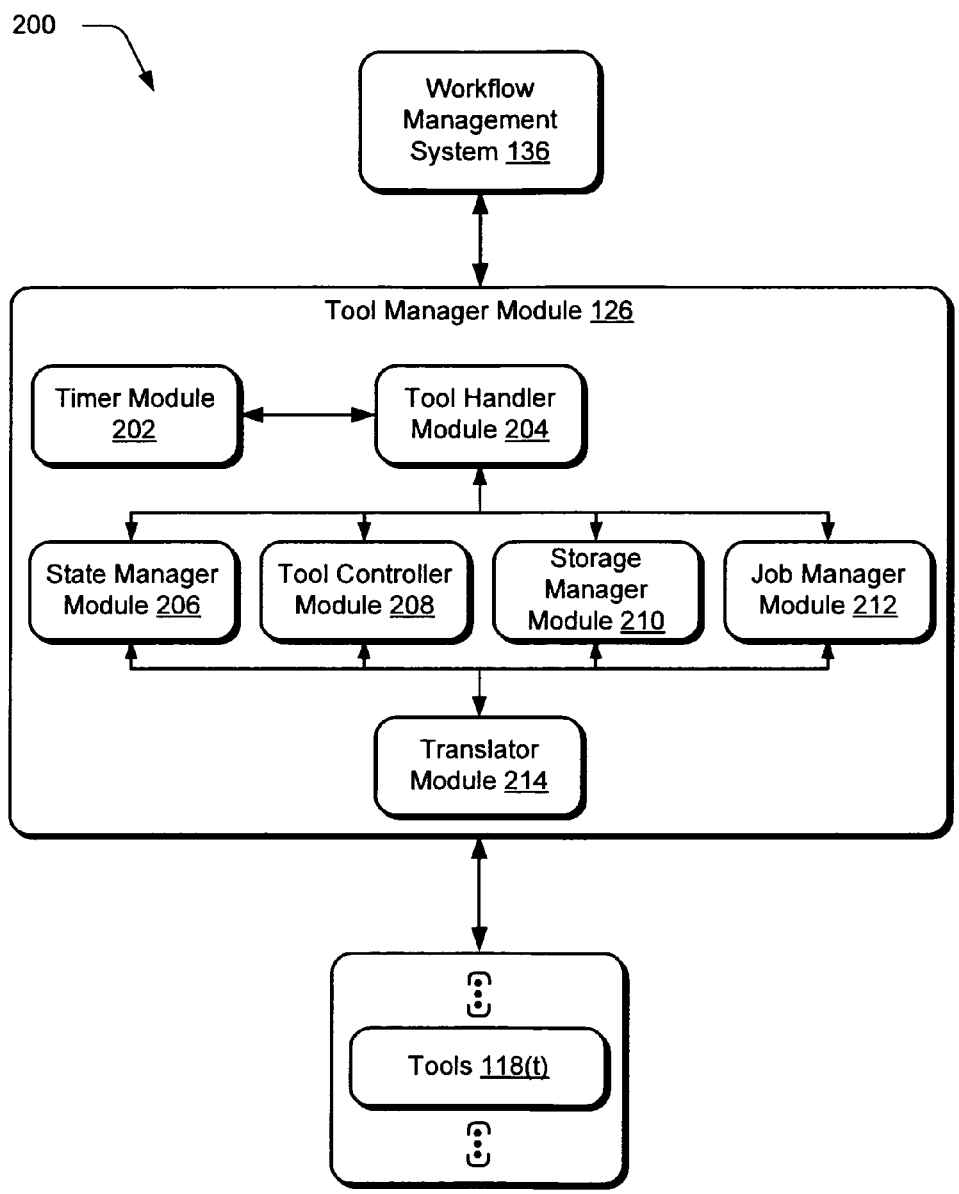
FIG. 2 is an illustration of a system in an exemplary implementation showing a tool manager module of FIG. 1 in greater detail.

FIG. 2 is an illustration of a system 200 in an exemplary implementation showing the tool manager module 126 in greater detail. The tool manager module 126 may be configured in a variety of ways to replace traditional manual procedures and processes used to manage workflow from tape-in acceptance through tape-out execution. The tool manager module 126, for instance, may track job status, provision resources, track resource utilization, and so on. Additionally, the tool manager module 126 may track and report status of the tools 118(t) in real time or at preconfigured intervals, such as to report anomaly conditions that may indicate errors encountered during execution of the tools 118(t).

The tool manager module 126, for example, is illustrated as including a timer module 202, a tool handler module 204, a state manager module 206, a tool controller module 208, a storage manager module 210, a job manager module 212 and a translator module 214. The tool handler module 204 is representative of functionality that handles execution of the tools, including polling an execution status of the tools 118(t) at predetermined intervals as indicated by the timer module 202. The state manager module 206 is representative of functionality to monitor a state in the execution of the tools 118(t), such as "pending", "completed", "error" and so forth. The tool controller module 208 is representative of functionality to manage interaction between the workflow management system 136 and the tools 118(t), such as to cause the translator module 214 to translate jobs into a form that is compatible (e.g., "understood") with the tools 118(t) and vice versa. Thus, the tool controller module 208 and the translator module 214 may correspond to the tool driver module 138 of FIG. 1.

The storage manager module 210 is representative of functionality that stores data describing the execution of the tools, which may be performed in "real-time", obtained at predetermined intervals as indicated by the timer module 202, and so on. The job manager module 212 is representative of functionality that tracks jobs received from the workflow management system 136 and provides configuration data 130(i) to the tools 118(t) that corresponds to the jobs. This functionality may be implemented in a variety of ways.

A technician, for example, may configure an execution sequence and other configuration data through interaction with a user interface of the workflow management system 136. This configuration data 130(i) may then be stored in storage 132 with other run-time execution data to be used by the tools 118(t). The technician may then initiate execution of the tools 118(t) via an event that triggers the job manager module 212 to schedule tool execution given resource availability, priority assigned to execution of the tools 118(t), and so on.

The tool controller module 208 may be used to manage the tools during execution, such as to provide interfaces to query/report resource availability, initiate tool execution, query/report tool execution status and control tool execution. The tool controller module 208 may also report utilization metrics and the execution state at a configurable time interval, which may be indicated through use of the tool handler module 204 and the timer module 202.

Through use of the tool manager module 126, changes encountered to the job (i.e., workflow) during scheduling and/or execution of the tools 118(t) may be addressed. For example, the changes may cause execution of another one of the tools 118(t), a notification to be provided to engineers regarding errors, re-provisioning of resources to address the changes, and so on. The separation of concern (clear functional partitioning) in this example between tool and computer resource abstraction and event driven architecture allows for a scalable, modular and flexible tape-out tool execution management. It should be realized that in another implementation, however, the functionality of the workflow management system 136 may be incorporated within the tool manager module 126 without departing from the spirit and scope as previously described. Further discussion of tool manager execution may be found in relation to the following procedures.

Although a variety of components were described that represent functionality employable by the tool manager module 126, it should be readily apparent that the tool manager module 126 is not limited to this functionality. Further, it should also be readily apparent that the represented functionality may be further divided, combined, and so on without departing from the spirit and scope thereof.

Exemplary Procedures

The following discussion describes management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
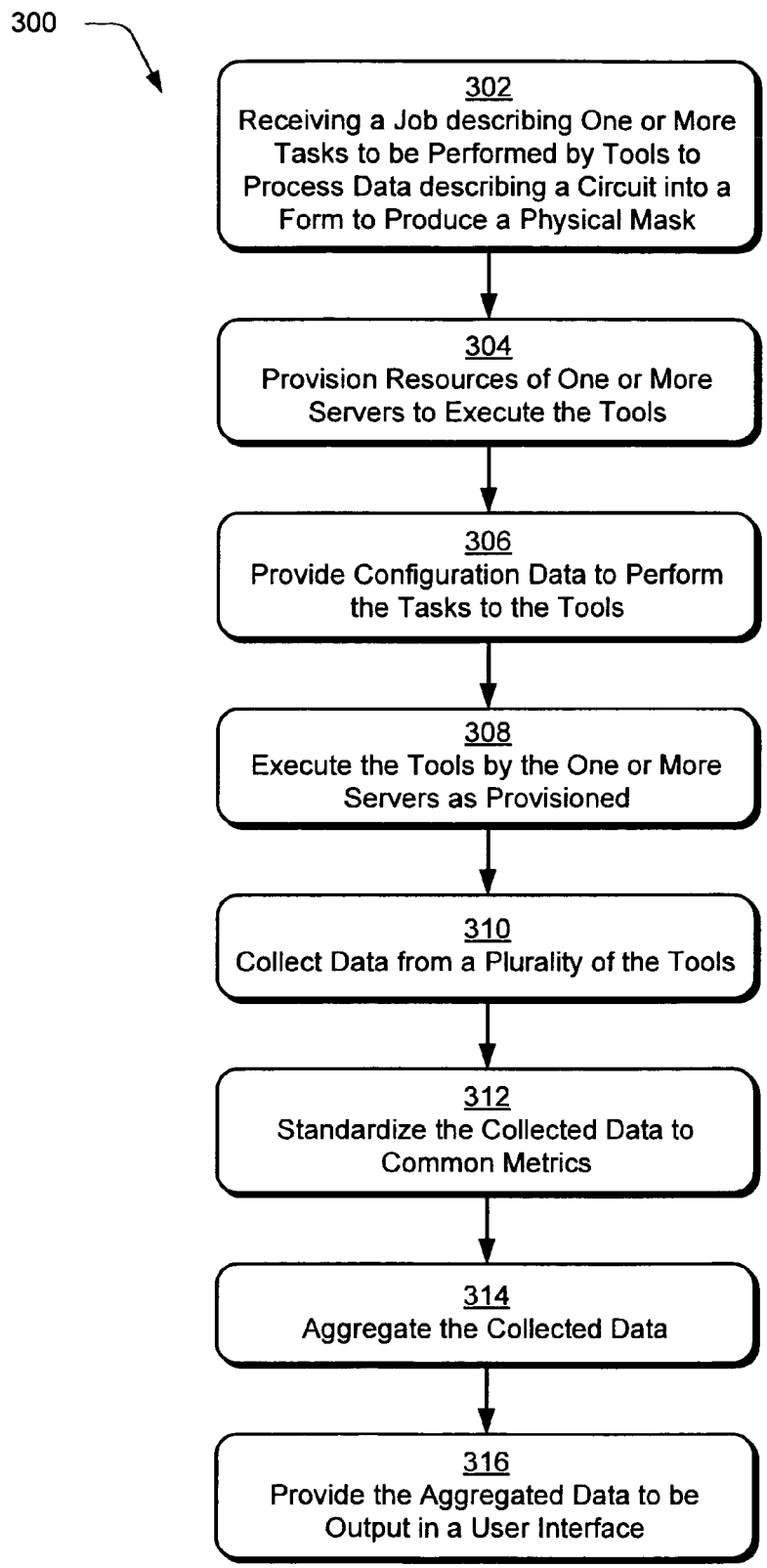
FIG. 3 is a flow diagram depicting a procedure in an exemplary implementation in which a job received by a tool manager model is provisioned for execution by tools to create a physical layout of a circuit from a circuit design file.

FIG. 3 depicts a procedure 300 in an exemplary implementation in which a job received by a tool manager model is provisioned for execution by tools to create a physical layout of a circuit from a circuit design file. A job is received describing one or more tasks to be performed by tools to process data describing a circuit into a form to produce a physical mask (block 302). The job, for instance, may reference tools that are to perform the tasks, configurations to be employed by those tools, a sequence for performing the tasks, and so on.

Resources of one or more servers are provisioned to execute the tools (block 304). The provisioning may be performed in a variety of ways. The tool manager module 126, for instance, may determine an amount of resources consumed through execution of the respective tools, an amount of time desired to perform the execution, current use of resources by other tools, a priority to be used during execution (e.g., assigned by the job), and so on and provision the resources of the servers 104(s) accordingly. For example, the tool manager module 126 may determine that a particular tool might server as a "bottleneck" in the performance of the job and therefore provision additional resources to counteract that potential inefficiency. A variety of other examples are also contemplated.

Configuration data is provided to perform the tasks to the tools (block 306). The tool manager module 126, for instance, may retrieve configuration data 130(i) from storage 132 and provide this configuration data to the tools 118(t) automatically and without user intervention. The tools may then be executed by one or more of the servers as provisioned (block 308) using the configuration data to process the circuit design file 120.

Data is collected from a plurality of the tools (block 310). The tool manager module 126, for instance, may monitor execution of the tools 118(t) in real time to watch for errors, determine a completion status, and so on. In another implementation, the tool manager module 126 periodically polls the tools 118(t) at preconfigured intervals, further discussion of which may be found in relation to FIG. 4. A variety of other implementations are also contemplated.

The collected data is standardized to common metrics (block 312). Two or more of the tools 118(t), for instance, may use different types of data to describe the execution state of the tools 118(t). Therefore, this data may be standardized by the tool manager module 126 such that it is compatible with a workflow management system 136. The collected data is then aggregated (block 314) and provided for output in a user interface (block 316). The workflow management system 136, for instance, may include a user interface such that a technician may monitor the execution state of the tools 118(t). In another instance, the tool manager 102 outputs the user interface.

Figure 4:
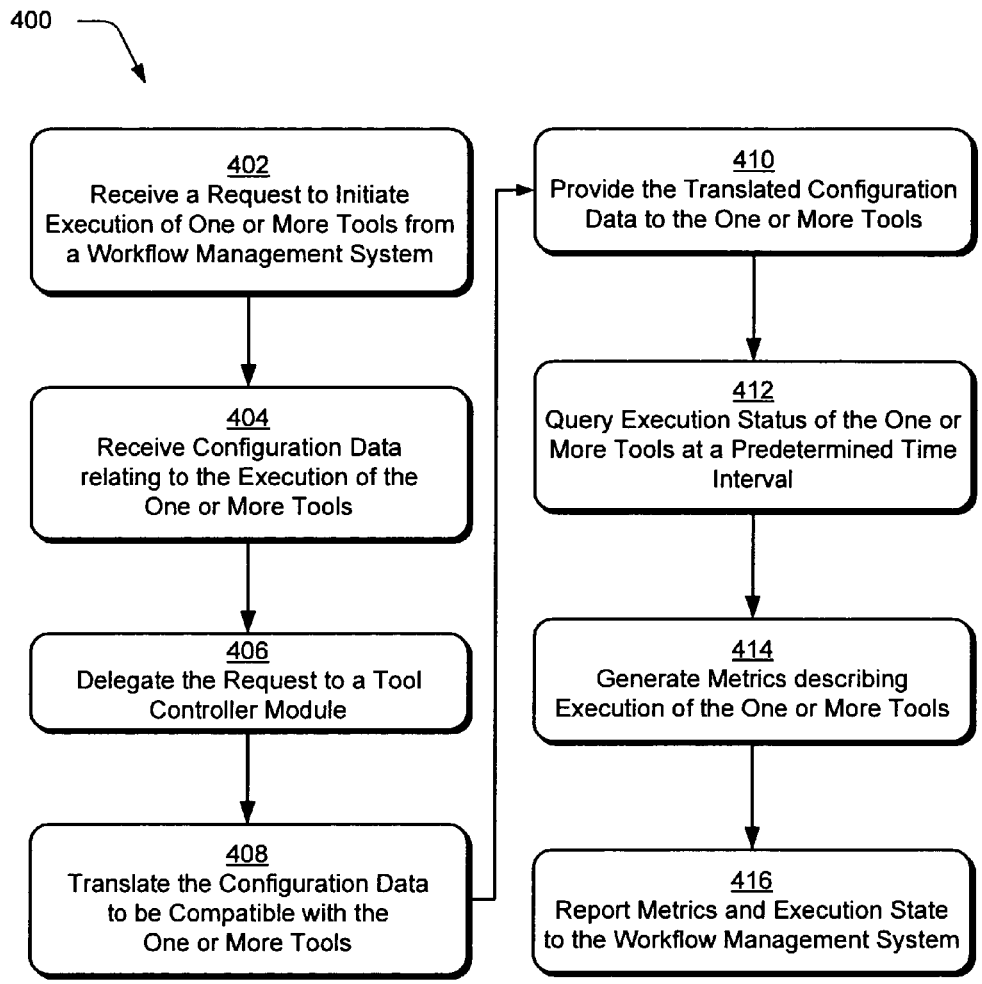
FIG. 4 is a flow diagram depicting a procedure in an exemplary implementation showing interaction between a workflow management system and a tool manager of FIG. 2.

FIG. 4 depicts a procedure 400 in an exemplary implementation showing interaction between a workflow management system and a tool manager including components as described in relation to FIG. 2. A request is received to initiate execution of one or more tools from a workflow management system (block 402). For example, the workflow management system may be used to determine which tools to execute based on the configured dependencies (e.g., an order of execution) and resource availability and initiate tool execution through communication with the tool manager module 126, and more particularly the tool handler module 204.

Configuration data is received that relates to the execution of the one or more tools (block 404). The workflow management system 136, for instance, may invoke a method of the tool handler module 204 to pass configuration data. The tool handler module 204 may then delegate the request to the tool controller module 204 (block 406).

The tool controller module 204 then initiates the translator module 214 to translate the configuration data to be compatible with the one or more tools (block 408). For example, the workflow management system 136 may be compatible with a MICROSOFT WINDOWS (MICROSOFT and WINDOWS are both registered trademarks of the Microsoft Corp, Redmond Wash.) platform and the tools 118(t) may be Unix compatible. In such an example, the tool controller module 204 may transforms the configuration parameters to a native Unix command file having command line arguments and/or environment variables settings used to execute the tool.

The translated configuration data is then provided to the one or more tools (block 410). The tool controller module 208 and/or the translator module 214, for instance, may provide the translated data over a shell prompt, e.g., secure shell (SSH) protocol and/or secured file transfer protocol (SFTP).

Execution status of the one or more tools is polled at predetermined time intervals (block 412). The tool handler module 204, for instance, may monitor the timer module 202 such that when a configurable time interval passes, the tool handler module 204 queries the state manager module 206 and/or queries the job manager module 212.

Additionally, the tool handler module 204 may generate metrics which describe the execution status of the tools (block 414), such as amount of time used to performed the execution of the tool, resources used, and so on such that the tool hander module 204 may dynamically re-provision resources. In this example, the tool handler module 204 is thus able to adjust execution of the tools in "real time" to improve efficiency in the use of the resources of the servers 104(s) and the tools 118(t) themselves.

The metrics and the execution state are then reported back to the workflow management system (block 416). In this way, the workflow system may then notify the technician of job completion or errors and schedule the next tool for execution based on the resource availability. Additionally, the metrics and the execution state may be reported to a data warehouse to generate metrics and/or reports. This event driven and stateless scheduling allows for highly modular, flexible and scalable tool execution system.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method executed by a workflow management system, the method comprising:

receiving circuit design data;

managing, by the workflow management system, execution of a plurality of tape-out tools processing the data describing a circuit design, wherein managing execution of the plurality of tape-out tools comprises:

provisioning resources of a plurality of servers that execute the plurality of tape-out tools, wherein the provisioning is performed according to: a priority assigned to each tape-out tool; a priority assigned to each task performed by a tape-out tool;

an amount of resources consumed through execution of a respective task assigned to a tape-out tool;

an amount of time desired to perform an execution of a task; and current usage of resources by other tape-out tools; and re-provisioning the resources;

tracking, by the workflow management system, an execution state of each of the plurality of tape-out tools during execution, wherein tracking the execution state of each of the plurality of tape-out tools during execution comprises;

collecting data from the plurality of tape-out tools during execution; and standardizing the collected data into common metrics, wherein common metrics comprise an amount of time used and resources used to perform a task execution on a respective tape-out tool and;

facilitating the output of mask data from the plurality of tape-out tools to create a physical mask and providing data describing the execution state of each of the plurality of tape-out tools to be output in a user interface; wherein the providing is performed simultaneously with the execution of the plurality of tape-out tools.

2. A method as described in claim 1, wherein:

the mask data to produce the physical mask describes a physical layout of a circuit described by the circuit design data; and the physical mask is configured to produce a semiconductor device having the circuit design.

3. A method as described in claim 1, wherein the tracking is performed at predetermined intervals.

4. A method as described in claim 1, wherein the execution state describes a completion status of a respective said tape-out tool of the plurality of tape-out tools.

5. A method as described in claim 1, wherein the execution state describes an error status of a respective said tape-out tool of the plurality of tape-out tools.

6. A non-transitory computer-readable storage medium encoded with instructions that, when executed by a processor of a device, cause the device to perform acts comprising:

receiving circuit design data;

managing, by a workflow management system, execution of a plurality of tape-out tools processing the data describing a circuit design, wherein managing execution of the plurality of tape-out tools comprises:

provisioning resources of a plurality of servers that execute the plurality of tape-out tools, wherein the provisioning is performed according to: a priority assigned to each tape-out tool; a priority assigned to each task performed by a tape-out tool;

an amount of resources consumed through execution of a respective task assigned to a tape-out tool;

an amount of time desired to perform an execution of a task; and current usage of resources by other tape-out tools; and re-provisioning the resources;

tracking, by the workflow management system, an execution state of each of the plurality of tape-out tools during execution, wherein tracking the execution state of each of the plurality of tape-out tools during execution comprises;

collecting data from the plurality of tape-out tools during execution; and standardizing the collected data into common metrics, wherein common metrics comprise an amount of time used and resources used to perform a task execution on a respective tape-out tool and;

facilitating the output of mask data from the plurality of tape-out tools to create a physical mask; and providing data describing the execution state of each of the plurality of tape-out tools to be output in a user interface; wherein the providing is performed simultaneously with the execution of the plurality of tape-out tools.

7. A non-transitory computer-readable storage medium as described in claim 6, wherein provisioning of resources is based at least in part through monitoring a previous execution of the plurality of tape-out tools.

* * * * *